Figure 1:
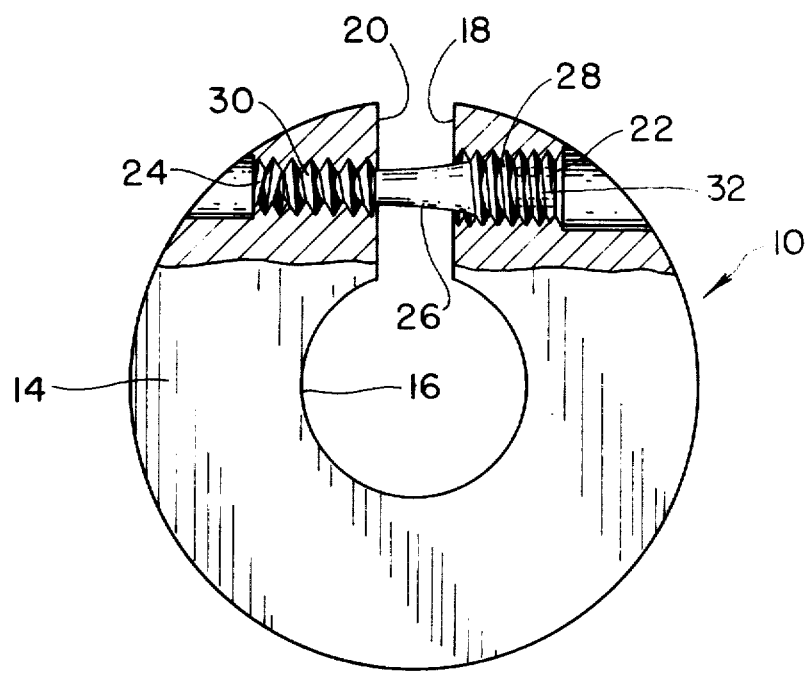

United States Patent [19]
Crispell

[11] 3,876,318
[45] Apr. 8, 1975

[54] SHAFT GRIPPING COLLAR
[75] Inventor: Corey F. Crispell, Warminster, Pa.
[73] Assignee: Standard Pressed Steel Co., Jenkintown, Pa.
[22] Filed: July 16, 1973
[21] Appl. No.: 379,838

[52] U.S. Cl. ............... 403/290; 85/1 SS; 403/261; 403/344; 403/362
[51] Int. Cl. .................................. F16d 1/06
[58] Field of Search ........ 85/1 R, 1 SS; 151/14, 41; 403/344, 261, 290, 362; 287/DIG. 4, DIG. 7

[56] References Cited
UNITED STATES PATENTS

| | | |
|---|---|---|
| 439,660 | 11/1890 | Holmquist .................... 287/DIG. 4 |
| 448,087 | 3/1891 | Simonson ..................... 287/DIG. 4 |
| 995,478 | 6/1911 | Nelson ............................ 403/344 |
| 1,447,448 | 3/1923 | Walch ............................. 85/1 SS |
| 1,539,826 | 6/1925 | Boutelle ............................ 351/99 |
| 2,485,280 | 10/1949 | Grace ............................... 85/1 R |
| 3,109,663 | 11/1963 | Phillips, Jr. ....................... 403/344 |

Primary Examiner—Werner H. Schroeder
Assistant Examiner—Conrad L. Berman

[57] ABSTRACT

A collar comprising an annular ring member having an inner clamping surface and a pair of opposed generally parallel faces. Through each of the faces is a threaded opening which cooperate with a differential screw for expanding or contracting the diameter of the clamping surface.

3 Claims, 2 Drawing Figures

SHAFT GRIPPING COLLAR

The present invention relates to an improvement in a shaft gripping collar and, more particularly, to a shaft gripping collar of the type that is adapted to grip a shaft without marring or damaging the surface thereof.

Shaft gripping collars generally comprise a ring member having an inner diameter of a dimension sufficient to slide over a shaft with which it is to be used and a set screw extending radially through the ring member from its outer to its inner diameter to engage the shaft and secure the collar. Collars of this type enjoy wide usage in attaching pulleys, gears, rotary cutting elements and bearings to a shaft without the use of key ways or other special formations on the shaft. In a large variety of applications, however, it is undesirable to have the shaft marred by the set screw, for example, the shaft may be made of an expensive or easily damaged material or the shaft may be threaded and the inner diameter of the collar may include a cooperating thread. In the latter case, the thread on the shaft, if damaged, would not properly engage the thread in the collar.

Accordingly, it is an object of this invention to provide a collar that will not damage the shaft with which it is used.

It is another object of this invention to provide a collar that is simple, efficient and economical to manufacture and use.

It is yet another object of this invention to provide a collar that can be easily expanded and contracted to facilitate its assembly and disassembly from the shaft and, also, its adjustment along the length of the shaft.

These and other objects are accomplished by providing a collar comprising an annular split ring member with opposed generally parallel end faces. The inner diameter of the ring may be threaded or unthreaded and comprises the gripping surface which engages the shaft with which the ring is to cooperate. Through each of the end faces is a threaded opening which cooperates with a differential screw to expand and contract the gripping surface of the ring. Preferrably, the diameter of the gripping surface is slightly smaller than the diameter of the shaft which it is to accommodate so that the ring is prestressed.

Figure 2:
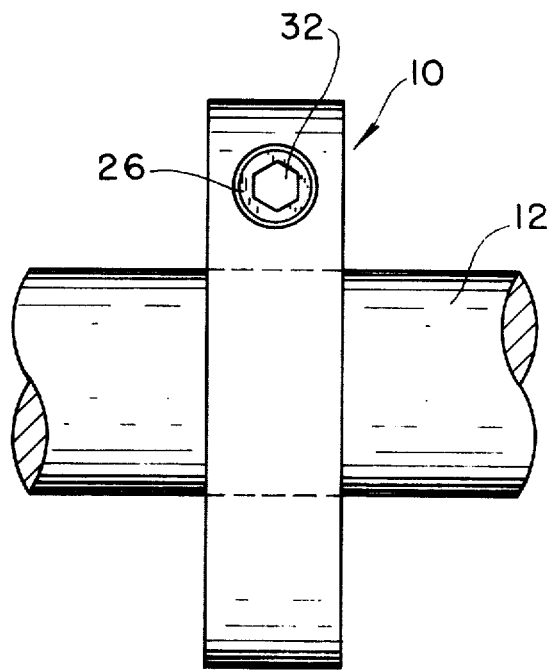

For a better understanding of the invention reference may be made to the following description of a preferred embodiment, taken in conjunction with the figures of the accompanying drawing, in which:

FIG. 1 is a front plan view partly in section of a collar in accordance with this invention; and, FIG. 2 is a side view of the collar illustrated in FIG. 1 and showing the collar engaged with a shaft.

Referring to the drawings, there is illustrated a collar 10 in clamping engagement with a shaft 12. Collar 10 comprises an annular ring member 14 having a gripping surface 16 formed by its inner diameter and a pair of opposed generally parallel end faces 18 and 20. Separating the end faces is a gap or space that allows the end faces to move toward or away from each other, thereby contracting or expanding the diameter of gripping surface 16. It should be noted that the diameter of gripping surface 16 is slightly smaller than the diameter of shaft 12 and that the ring is preferably made from a resilient steel whereby the ring must be expanded and stressed to fit over shaft 12 and then because of its resiliency tends to contract and tightly grip the shaft.

Formed through end face 18 is a first threaded opening 22 and formed through end face 20 is a second threaded opening 24. The lead, that is, the axial displacement per each complete revolution of the thread, of opening 22 is greater than the lead of opening 24. A differential screw 26 has a first threaded portion 28 adapted to cooperate with threaded portion 22 and a second threaded portion 30 adapted to cooperate with threaded opening 24. The lead of threaded portion 28 matches that of threaded opening 22 and the lead of threaded portion 30 matches that of opening 24. As will be made clearer hereinafter, rotation of screw 26 causes gripping surface 16 to expand or contract depending on the direction of rotation. Formed in the end of screw 26 is a wrenching socket 32 which can be engaged by a suitable wrench to rotate the screw.

In the embodiment illustrated herein, rotation of screw 26 in a clockwise direction causes end face 18 to move axially along the screw toward the right as depicted in FIG. 1 and, further, causes end face 20 to also move axially along the screw toward the right as viewed in FIG. 1. Since the lead of threaded opening 22 and thread 28 is greater than that of threaded opening 24 and thread 30, movement of end face 18 is greater than movement of end face 20 so that the end faces are spaced further apart and the diameter of gripping surface 16 is increased. Rotation of screw 26 in a counterclockwise direction causes movement of end face 18 toward the left as viewed in FIG. 1 and causes movement of end face 20 also toward the left as viewed in FIG. 1. Again, since the lead of opening 22 and thread 28 is greater than that of opening 24 and thread 30, movement of end face 18 is greater than that of end face 20 causing the space between the end faces to become smaller whereby the diameter of gripping surface 16 is decreased. Thus, to open the ring and allow it to be inserted on shaft 12 screw 26 is rotated in a clockwise direction and to tighten the ring so that surface 16 grips the shaft, the screw is rotated in a counterclockwise direction. The preceding description presumes the use of conventional right hand threads and it should be understood that if left hand threads are utilized the direction of rotation for opening and tightening the screw would be opposite that described with respect to a right hand thread.

Finally, the diameter of opening 22 is greater than the diameter of opening 24 and, of course, the diameter of threaded section 28 is larger than the diameter of threaded section 30. When assembling screw 26 with ring 14, threaded section 30 of screw 26 is inserted through opening 22 until threaded section 28 engages opening 22. At this point, screw 26 is rotated in a clockwise direction causing it to move axially along opening 22 until threaded section 30 engages threaded opening 24. Continued rotation of screw 26 provides the necessary engagement between the threads of the screw and the threads of the openings.

From the preceding description of a preferred embodiment of the invention, it can be seen that a shaft gripping collar has been provided that will not mar the shaft with which it is used. In addition, it should be clear that if screw 26 should break, the collar will still grip the shaft because the diameter of surface 16 is smaller than that of shaft 12, and the collar will still be within its elastic limit whereby its spring tension is exerted on the shaft. Further, vibration forces tending to loosen screw 26, that is, causing the screw to back out of the openings, will cause the collar to tighten on the shaft so that it will more tightly grip the shaft.

It should be noted, that various techniques can be utilized for varying the lead of the threaded connections, for example, by varying the number of threads per inch in each threaded connection, the fewer the threads, the larger the lead. It should also be noted that gripping surface 16 need not be a smooth bore, but that it could be threaded and cooperate with a threaded shaft so that it functions as an adjustable locknut. When functioning as a locknut, adjustment is facilitated since screw 26 need only be turned to allow movement without disassembling the screw from the ring.

While there has been described a preferred embodiment of the invention, it should be understood that various modifications obvious to one skilled in the art may be made without departing from the spirit and scope of the invention. Accordingly, the scope of the invention is set out in the appended claims.

I claim:

1. A collar adapted to grip a shaft comprising a resilient annular split ring member formed to encompass the shaft and having an inner gripping surface with a diameter smaller than the diameter of the shaft, said ring member having opposed generally parallel faces, a first threaded opening extending through one of said faces and a second threaded opening extending through the other of said faces, the lead of said first threaded opening being greater than the lead of said second threaded opening and the diameter of said first threaded opening being greater than the diameter of said second threaded opening, a differential screw cooperating with said threaded openings for expanding and contracting said ring member, said screw having first and second threaded portions, said first threaded portion having a lead and diameter complementary to said first threaded opening and said second threaded portion having a lead and diameter complementary to said second threaded opening, said threaded openings and said threaded portions being related such that rotation of said screw into engagement with said threaded openings causes said ring member to expand and rotation of said screw out of engagement with said openings causes and allows said ring member to contract, whereby said screw must be rotated into engagement to expand said ring member to initially fit onto the shaft and out of engagement to contract and allow said ring member to more tightly grip the shaft.

2. A collar in accordance with claim 1 wherein said ring member has a generally smooth inner surface adapted to grip a shaft.

3. A collar in accordance with claim 1 wherein said ring member has a threaded inner surface adapted to cooperate with a threaded shaft.

* * * * *